United States Patent
Yoshimoto et al.

(10) Patent No.: US 8,966,363 B2
(45) Date of Patent: Feb. 24, 2015

(54) PRINT CONTROL PROGRAM AND METHOD

(75) Inventors: Tsutomu Yoshimoto, Osaka (JP);
Masanori Matsumoto, Osaka (JP);
Tomoko Toizumi, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 416 days.

(21) Appl. No.: 12/806,170

(22) Filed: Aug. 6, 2010

(65) Prior Publication Data
US 2011/0055693 A1   Mar. 3, 2011

(30) Foreign Application Priority Data

Aug. 26, 2009  (JP) ................................. 2009-194890

(51) Int. Cl.
*G06F 17/00* (2006.01)
*G06F 3/12* (2006.01)

(52) U.S. Cl.
CPC ............ *G06F 3/1284* (2013.01); *G06F 3/1219* (2013.01); *G06F 3/1256* (2013.01)
USPC ........................................................ 715/274

(58) Field of Classification Search
USPC ........................................................ 715/274
See application file for complete search history.

(56) References Cited

U.S. PATENT DOCUMENTS

| | | | |
|---|---|---|---|
| 6,293,717 B1 * | 9/2001 | Kurashina .................. | 400/615.2 |
| 6,927,865 B1 | 8/2005 | Kujirai et al. | |
| 7,085,006 B2 * | 8/2006 | Yokoyama et al. ............ | 358/1.9 |
| 2001/0053295 A1 * | 12/2001 | Kujirai et al. .................. | 399/79 |
| 2003/0056178 A1 * | 3/2003 | Sato .............................. | 715/527 |
| 2004/0066525 A1 * | 4/2004 | Zerza et al. ................... | 358/1.14 |
| 2004/0120596 A1 * | 6/2004 | Ishii et al. ..................... | 382/254 |
| 2004/0177336 A1 * | 9/2004 | Kujirai .......................... | 717/104 |
| 2005/0168760 A1 * | 8/2005 | Shibasaki ...................... | 358/1.6 |
| 2005/0206953 A1 | 9/2005 | Kujirai et al. | |
| 2006/0087666 A1 * | 4/2006 | Maniam et al. ................ | 358/1.9 |
| 2006/0221416 A1 * | 10/2006 | Yamada ......................... | 358/527 |
| 2007/0076235 A1 * | 4/2007 | Murata ......................... | 358/1.13 |
| 2008/0030818 A1 * | 2/2008 | Nagahara et al. ............. | 358/537 |
| 2008/0037058 A1 * | 2/2008 | Ban .............................. | 358/1.15 |
| 2010/0064211 A1 | 3/2010 | Kujirai et al. | |
| 2010/0293458 A1 * | 11/2010 | Rolleston et al. ............. | 715/274 |
| 2011/0032562 A1 * | 2/2011 | McCuen et al. ............. | 358/1.15 |

FOREIGN PATENT DOCUMENTS

| | | |
|---|---|---|
| JP | 2003-211745 A | 7/2003 |
| JP | 2003-260857 A | 9/2003 |
| JP | 2004-330639 A | 11/2004 |

(Continued)

*Primary Examiner* — Nathan Hillery
(74) *Attorney, Agent, or Firm* — Edwards Wildman Palmer LLP; George N. Chaclas

(57) ABSTRACT

A print control program according to the present invention makes an information processor control a printer. The printer is connected to the information processor and can do printing under the conditions set. The set conditions can reduce the consumption of printing media by the printer. The program includes a first step through a fourth step. The first step is to wait until an instruction is entered into the information processor to start printing under the set conditions. The second step is to analyze the set conditions if the information processor detects the entered instruction at the first step. The third step is to form a preview image representing an image or images as printed under the analyzed conditions at least one of which has been changed to further reduce the printing medium consumption. The fourth step is to display the formed preview image on the display of the information processor.

6 Claims, 15 Drawing Sheets

(56) References Cited

FOREIGN PATENT DOCUMENTS

| JP | 2005-186315 A | 7/2005 |
| JP | 2006-352801 A | 12/2006 |
| JP | 2008-022423 A | 1/2008 |
| JP | 2008-305417 A | 12/2008 |
| JP | 2009-104535 A | 5/2009 |

* cited by examiner

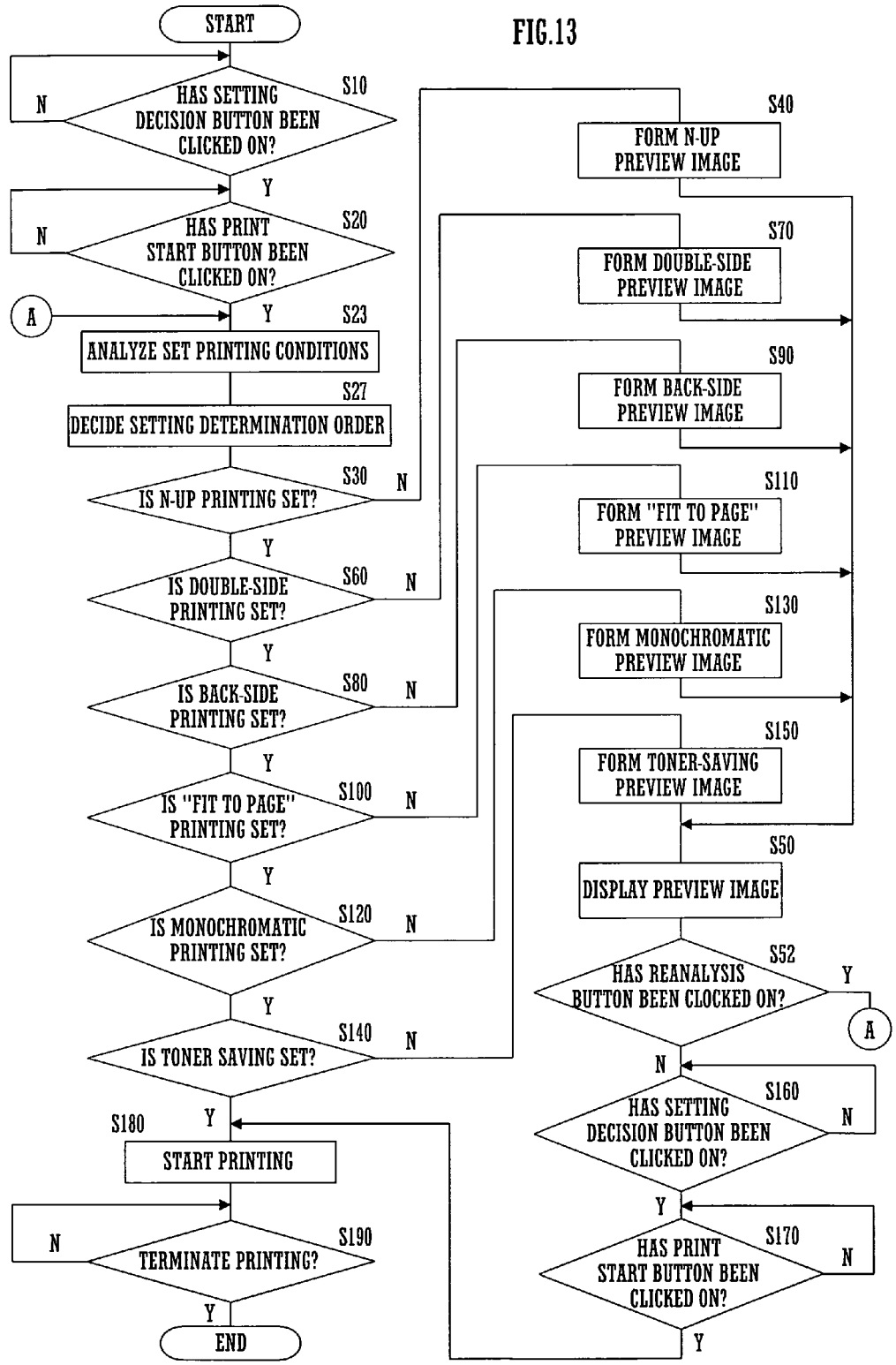

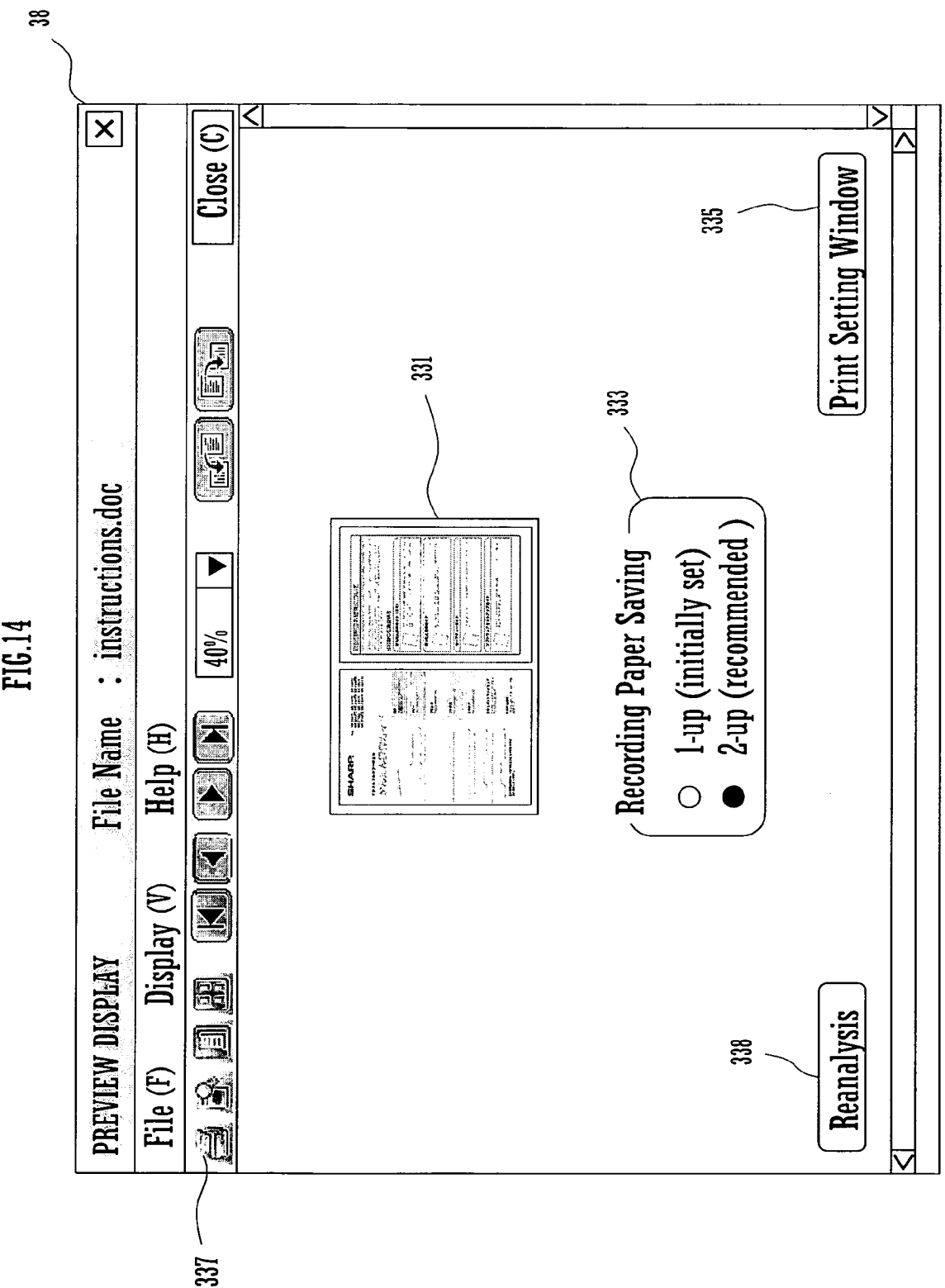

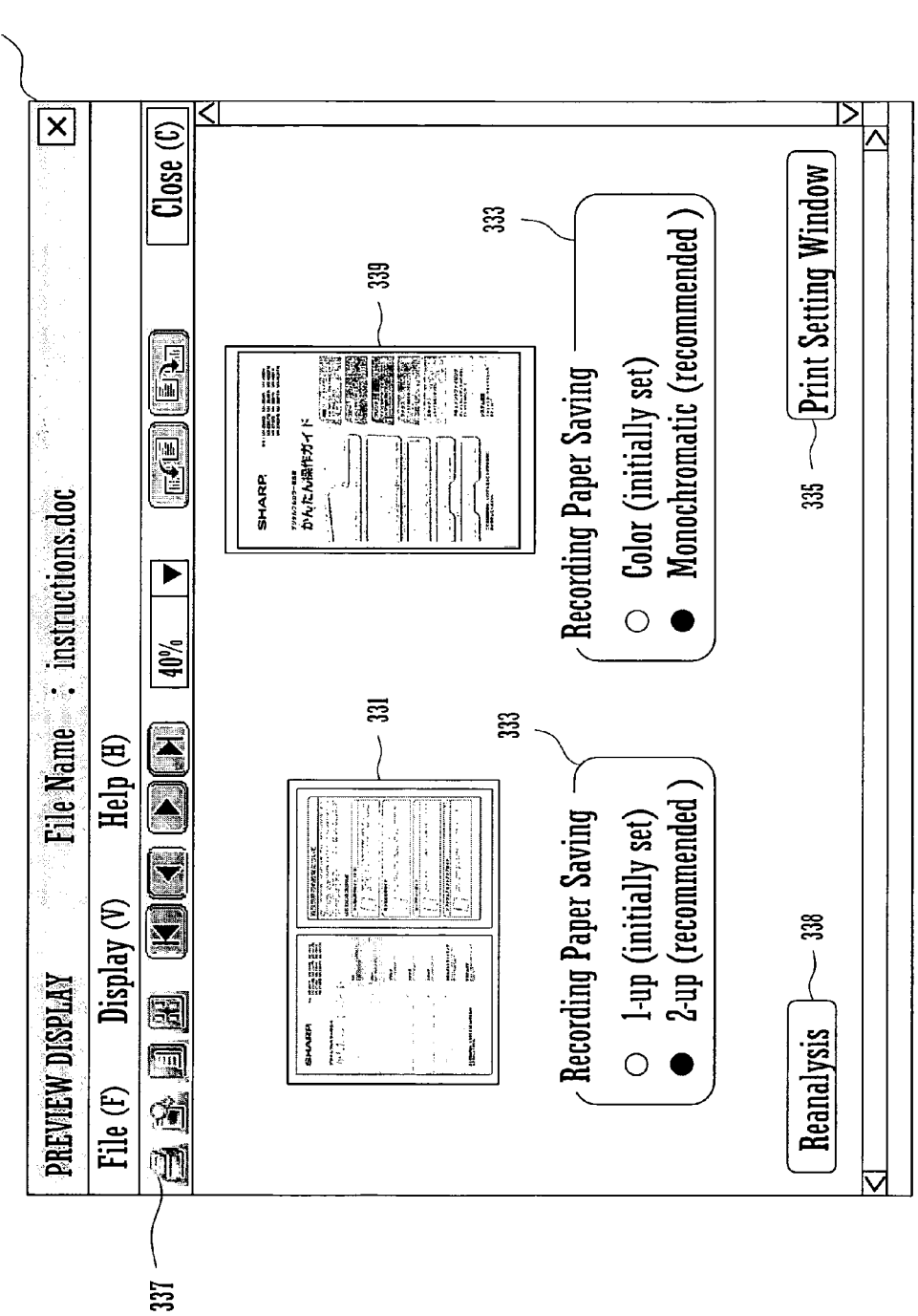

PRINT CONTROL PROGRAM AND METHOD

CROSS REFERENCE

This Nonprovisional application claims priority under 35 U.S.C. §119(a) on Patent Application No. 2009-194890 filed in Japan on Aug. 26, 2009, the entire contents of which are hereby incorporated by reference.

BACKGROUND OF THE INVENTION

The present invention relates to a program and a method for controlling the operation of a printer.

A printer, a copying machine, a facsimile machine, or another image forming apparatus may be connected to an information processor, in which a printer driver is installed. The information processor originates print data for image formation. If the information processor issues a print instruction and transmits it to the image forming apparatus, the apparatus prints an image according to the type of printing paper, the printing mode, and the other settings specified by a user in a window activated by the printer driver.

In recent years, from the perspective of terrestrial environment protection, it has been requested strongly to save the printing paper, colorant, and other printing media used by image forming apparatus. Some of the functions of image forming apparatus promote resource savings by reducing the number of sheets of printing paper used by the apparatus. One of the promoting functions is a double-side printing function for the printing of images on both sides of a sheet. Another of these functions is an aggregate printing function for the printing of two or more shrunk images on one sheet.

An image forming apparatus having a color printing function can save resource by reducing its consumption of color ink, color toner or other colorant by printing less important color images as monochromatic images.

JP-2008-022423-A discloses an image forming apparatus that can literally display printing conditions more effective for resource savings than those set by a user. The user can select one or more of the displayed conditions. If the user lacks experience in printing, it is difficult for the user to foresee from the literal display an image to be printed under the selected condition or conditions.

In view of the foregoing problem, the object of the present invention is to provide a print control program and a print control method that make it possible to prompt a user to resource savings (reduction in printing medium consumption), and that make it easy for the user to foresee an image or images as printed under a condition more effective for resource savings than a condition set by the user.

SUMMARY OF THE INVENTION

A print control program according to the present invention makes an information processor control a printer. The printer is connected to the information processor and can do printing under the conditions set by a user. The set conditions can reduce the consumption of at least one of printing media by the printer. The printing media are printing paper, toner and ink.

One of the set conditions may be N-up printing (N is 2 or a larger integer), which is the printing of images for two or more pages on one side of a sheet. Another of the conditions may be double-side printing, which is the printing of images on both sides of a sheet. Still another of the conditions may, if the printer is a color printer, be monochromatic printing, which is the printing of less important color images as monochromatic images.

The print control program includes a first step through a fourth step. The first step is to wait until an instruction is entered into the information processor to start printing under the set conditions. The second step is to analyze the set conditions if the information processor detects the entered instruction at the first step. The third step is to form a preview image representing an image or images as printed under the analyzed conditions at least one of which has been changed to further reduce the printing medium consumption. The fourth step is to display the formed preview image on the display of the information processor.

BRIEF DESCRIPTION OF THE DRAWINGS

FIG. 13 is a flowchart of the control process according to a print control program according to a fifth embodiment of the present invention.

FIGS. 14 and 15 are illustrations of the preview windows displayed according to the print control program according to the fifth embodiment.

DETAILED DESCRIPTION OF THE INVENTION

Figure 1:
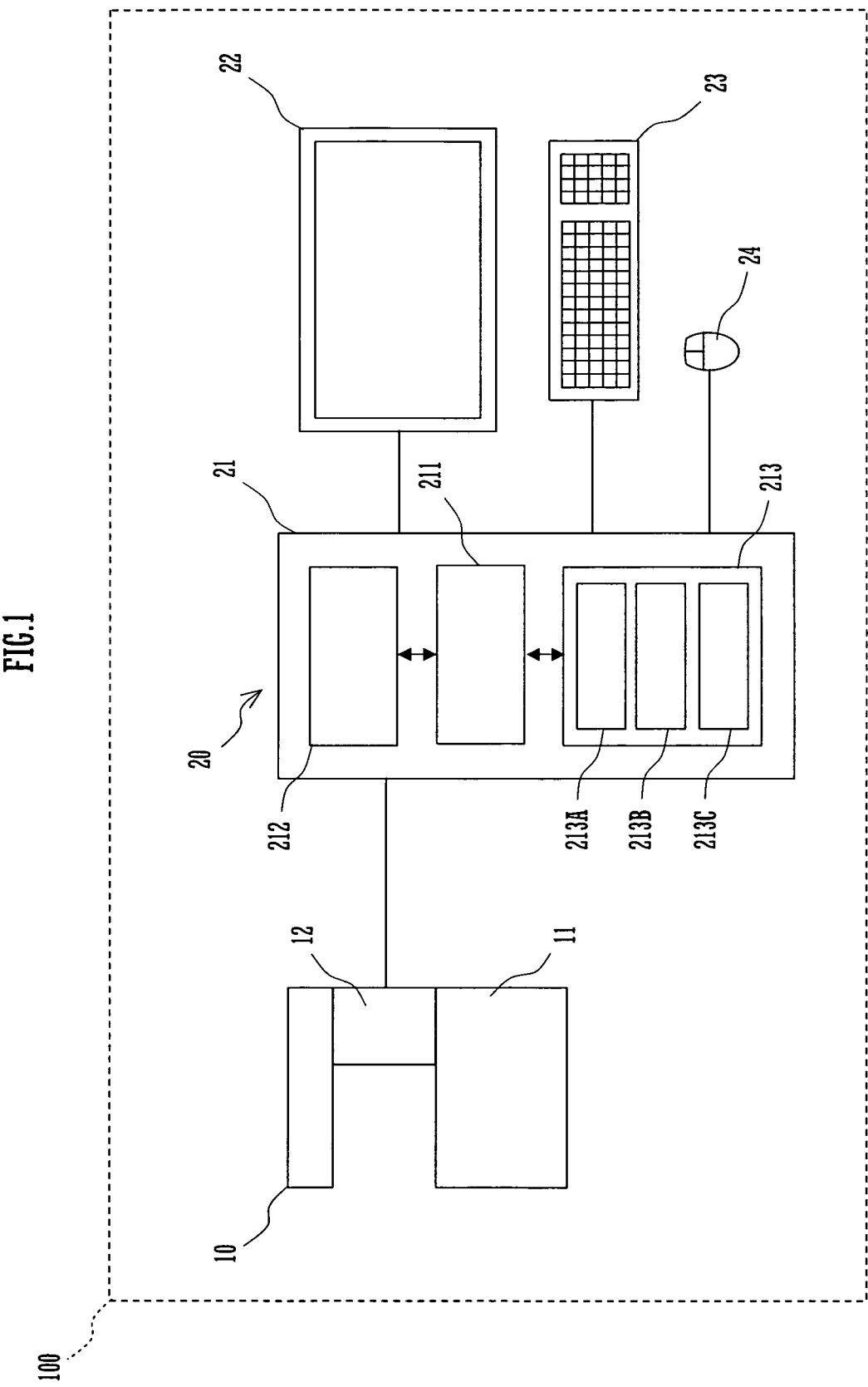
FIG. 1 is a block diagram of a printing system including an information processor for executing a print control program embodying the present invention.

With reference to FIG. 1, a printing system 100 consists of a color printer 10 and an information processor 20 that are connected together.

The printer 10 includes a paper feeding unit 11 and an image forming unit 12. The paper feeding unit 11 feeds the image forming unit 12 with a sheet of printing paper, which may be plain paper or photographic paper. The image forming unit 12 prints a color or monochromatic image on the sheet based on print data. The printer 10 may be a multi-function printer for electrophotographic printing.

The printer 10 has functions capable of reducing its consumption of at least one of printing media, which are printing paper, toner and ink. One of the functions is an N-up printing function (N is 2 or a larger integer) for the printing of images for two or more pages on one side of a sheet. Another of the functions is a side-side printing function for the printing of images on both sides of a sheet. Still another of the functions is a monochromatic printing function for the printing of less important color images as monochromatic images.

An electrophotographic printer, an ink jet printer and other printers might be connected to the information processor 20.

The information processor 20 may be a personal computer and includes a main body 21, a display 22, a keyboard 23, and a mouse 24. The main body 21 has a control unit 211, which includes a memory unit 212 and a program storage unit 213. The control unit 211 is connected to the display 22, keyboard 23, and mouse 24, and also connected to the printer 10 directly or via a network.

An operating system (not shown), an application program 213A for data origination, a printer driver 213B, and a print control program 213C are installed in the program storage unit 213. The control unit 211 controls the operation of the printer 10 with the printer driver 213B during printing. The print control program 213C is one of five print control programs according to first through fifth embodiments of the present invention.

The control unit 211 operates according to the programs in the program storage unit 213. While the application program 213A is active, the control unit 211 originates image data, which includes document data, based on data entered by means of the keyboard 23 and mouse 24. The control unit 211 converts the image data into display data, displays the display data on the display 22, and stores the image data in the memory unit 212.

While the printer driver 213B is active, the control unit 211 originates print data from the image data in the memory unit 212 based on data entered by means of the keyboard 23 and mouse 24. The control unit 211 outputs the print data to the printer 10 via an interface (not shown).

Figure 2:
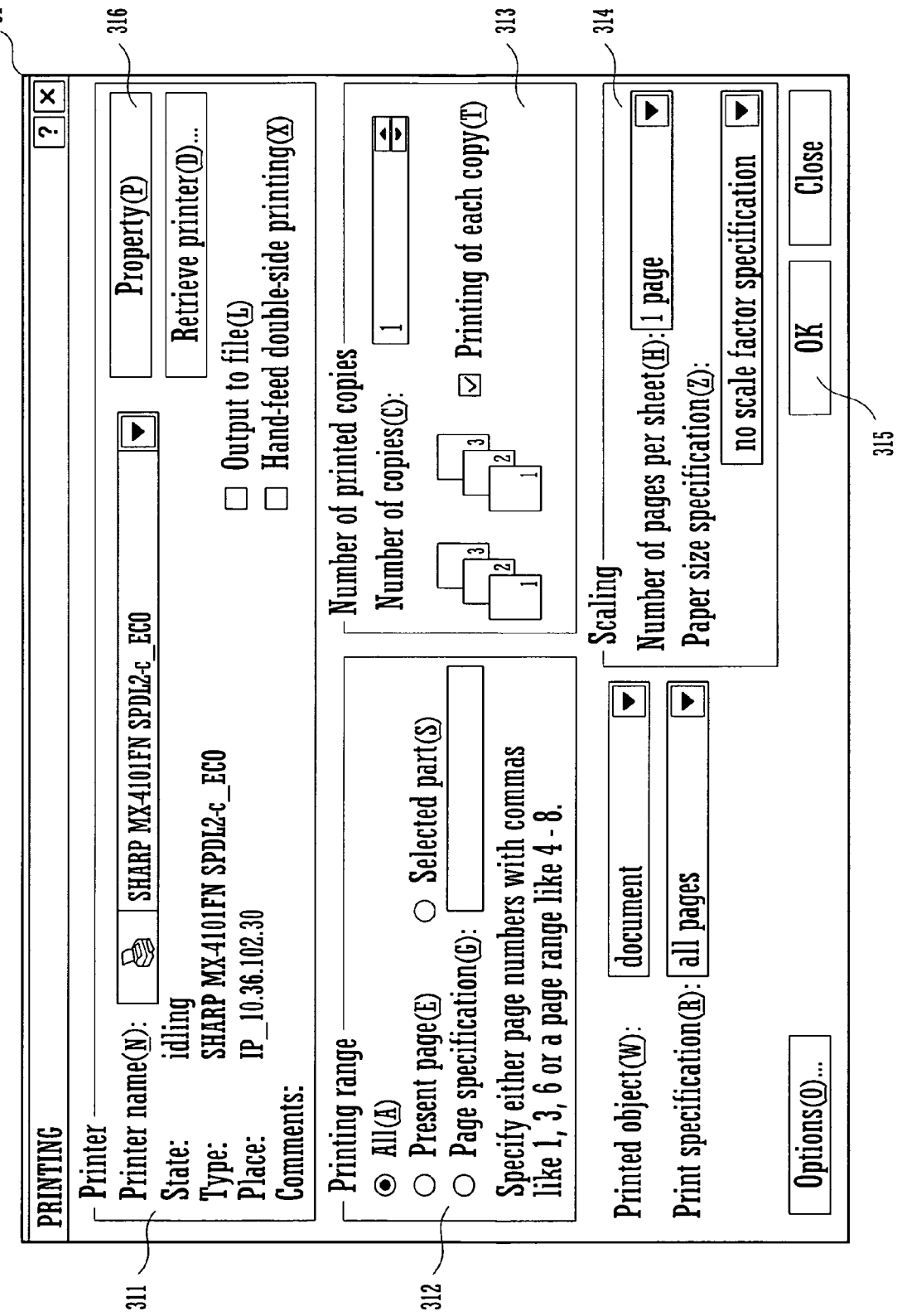
FIG. 2 is an illustration of the printing window displayed according to the printer driver installed in the information processor.

If a user requests printing by means of the keyboard 23 or mouse 24 while the application program 213A is active, the control unit 211 activates the printer driver 213B, so that a printing window 31 as exemplified by FIG. 2 appears on the display 22.

With reference to FIG. 2, a printer setting area 311, a print range area 312, an area 313 for the number of copies, a scaling area 314, and a print start button 315 are laid out in the printing window 31.

In the print range area 312, the user specifies the range that needs to be printed of the image data originated according to the application program 213A.

In the area 313 for the number of copies, the user specifies the number of copies that needs to be printed of the specified range of the image data.

The scaling area 314 shows settings for or computation results about the number of pages per sheet and the paper size as information necessary for the decision of the scale factor for the image or images that need to be formed on sheets of printing paper.

The name of the printer 10 is shown in the printer setting area 311. If the information processor 20 were connected to two or more printers, the user could select one of them in the area 311. In the area 311, a property button 316 is provided for setting confirmation. If the user clicks on the property button 316 by means of the mouse 24, a main setting window 32 as exemplified by FIG. 3 appears on the display 22.

Figure 3:
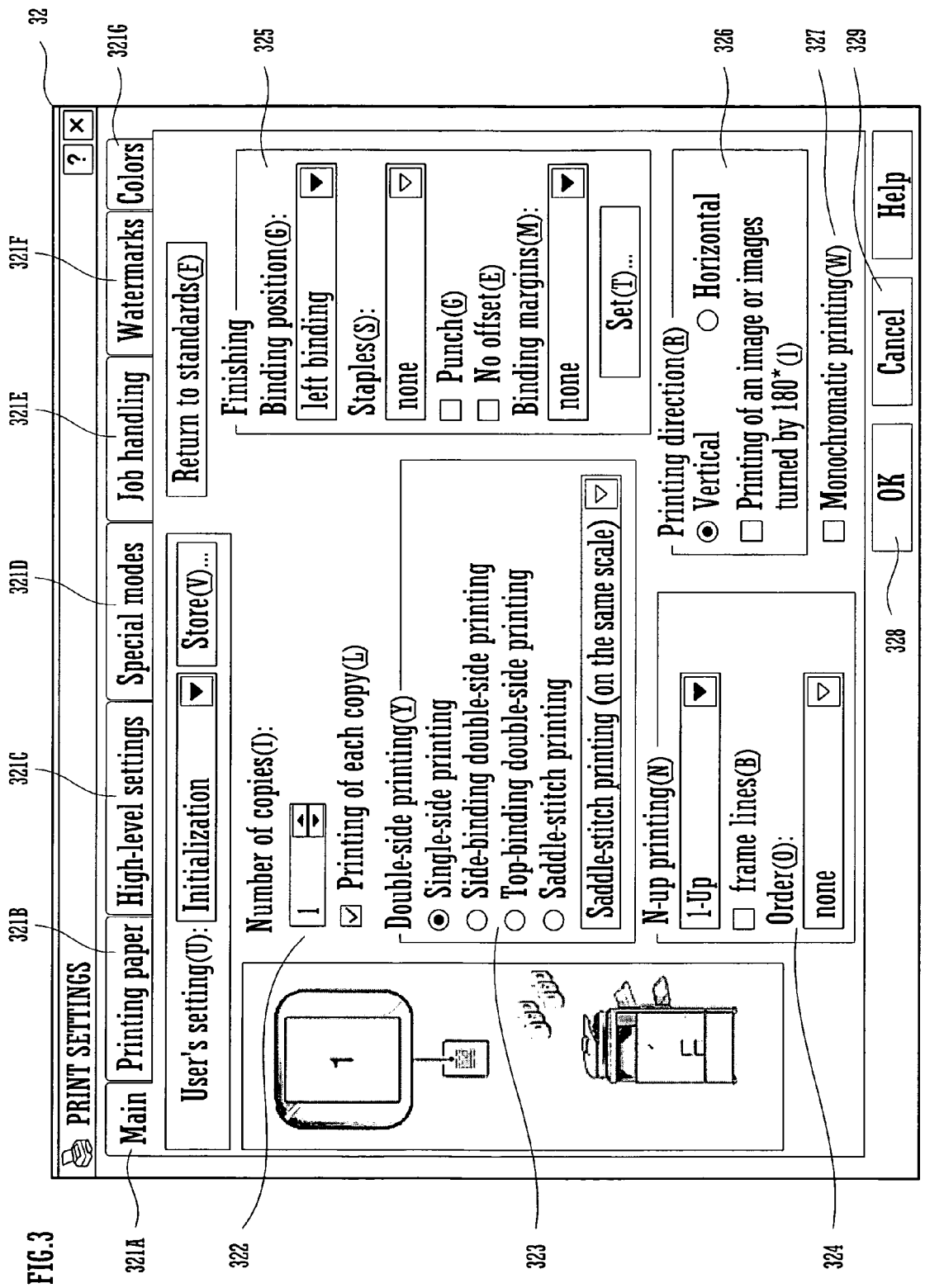
FIG. 3 is an illustration of the main setting window displayed according to the printer driver.

With reference to FIG. 3, the main setting window 32 has pages 321A-321G, each of which shows functions of the printer 10 and settings for them, and on which the settings can be changed. For example, the main page 321A includes areas 322-327, where the user can change the settings of the number of copies, double-side printing, aggregate printing, finishing, printing direction and monochromatic printing respectively.

The main setting window 32 also has a decision button 328 and a cancel button 329 as setting completion buttons, on which the user clicks when the user has confirmed and changed one or more of the settings in this window. The user can click on the decision button 328 to decide the changed setting or settings. The user can click on the cancel button 329 to cancel the changed setting or settings.

Figure 4:
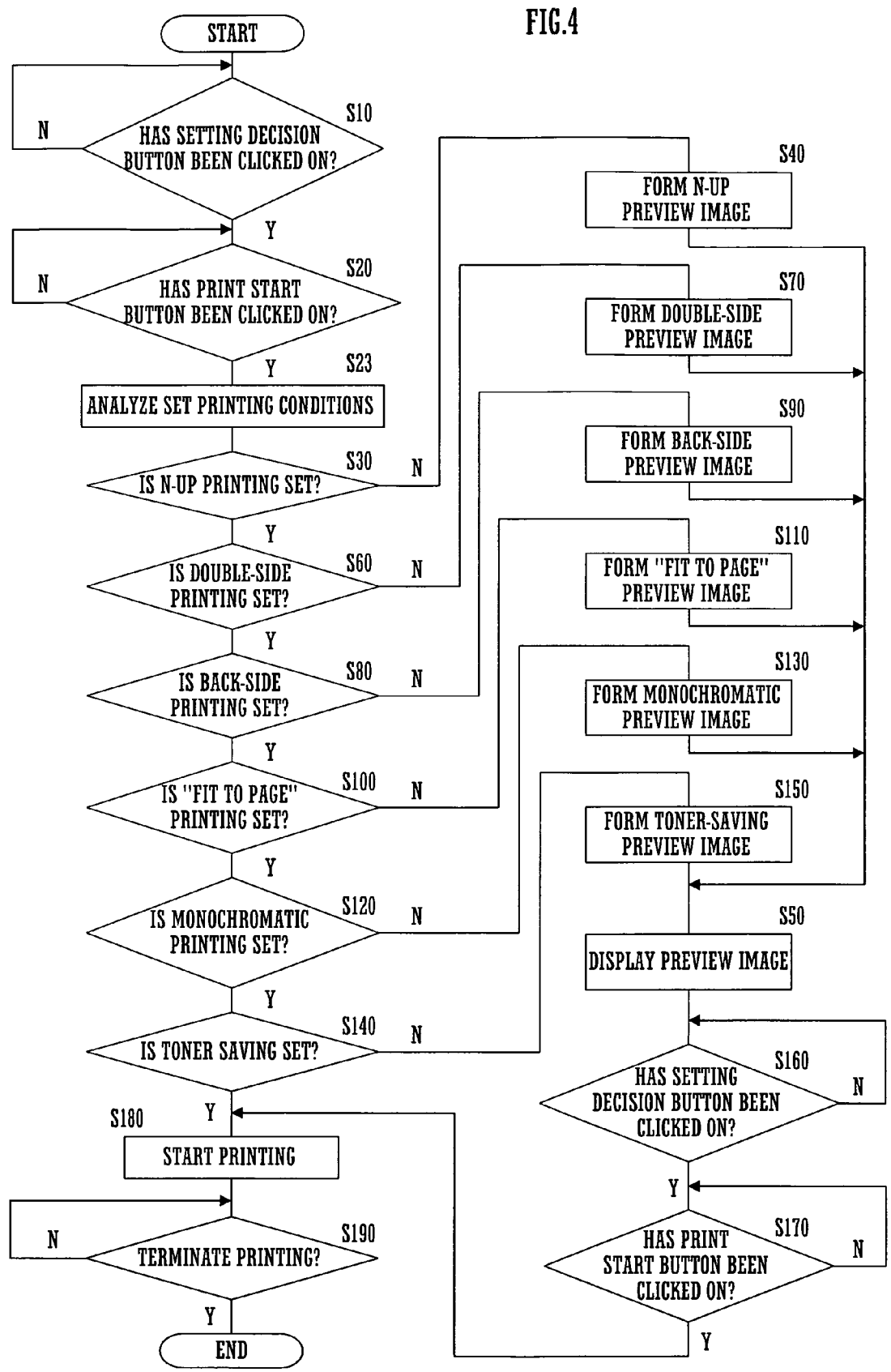
FIG. 4 is a flowchart of the control process according to a print control program according to a first embodiment of the present invention.

FIG. 4 shows the control process according to the print control program 213C according to the first embodiment.

The control unit 211 waits at S10 until the decision button 328 in the main setting window 32 is clicked on (NO at S10). If the control unit 211 determines at S10 that the decision button 328 has been clicked on (YES at S10), this unit waits at S20 until the print start button 315 in the printing window 31 is clicked on (NO at S20).

If the control unit 211 determines at S20 that the print start button 315 has been clicked on (YES in S20), this unit analyzes at S23 the printing conditions set in the main setting window 32. Based on the result of the condition analysis, the control unit 211 executes the succeeding steps in FIG. 4.

The control unit 211 determines at S30 whether N-up printing (N is 2 or a larger integer) is set. If the control unit 211 determines at S30 that N-up printing is not set, this unit forms at S40 a preview image representing two or more images as printed in an N-up printing mode. Then, at S50, the control unit 211 displays the preview image on the display 22. The displayed preview image is exemplified by FIG. 5.

Figure 5:
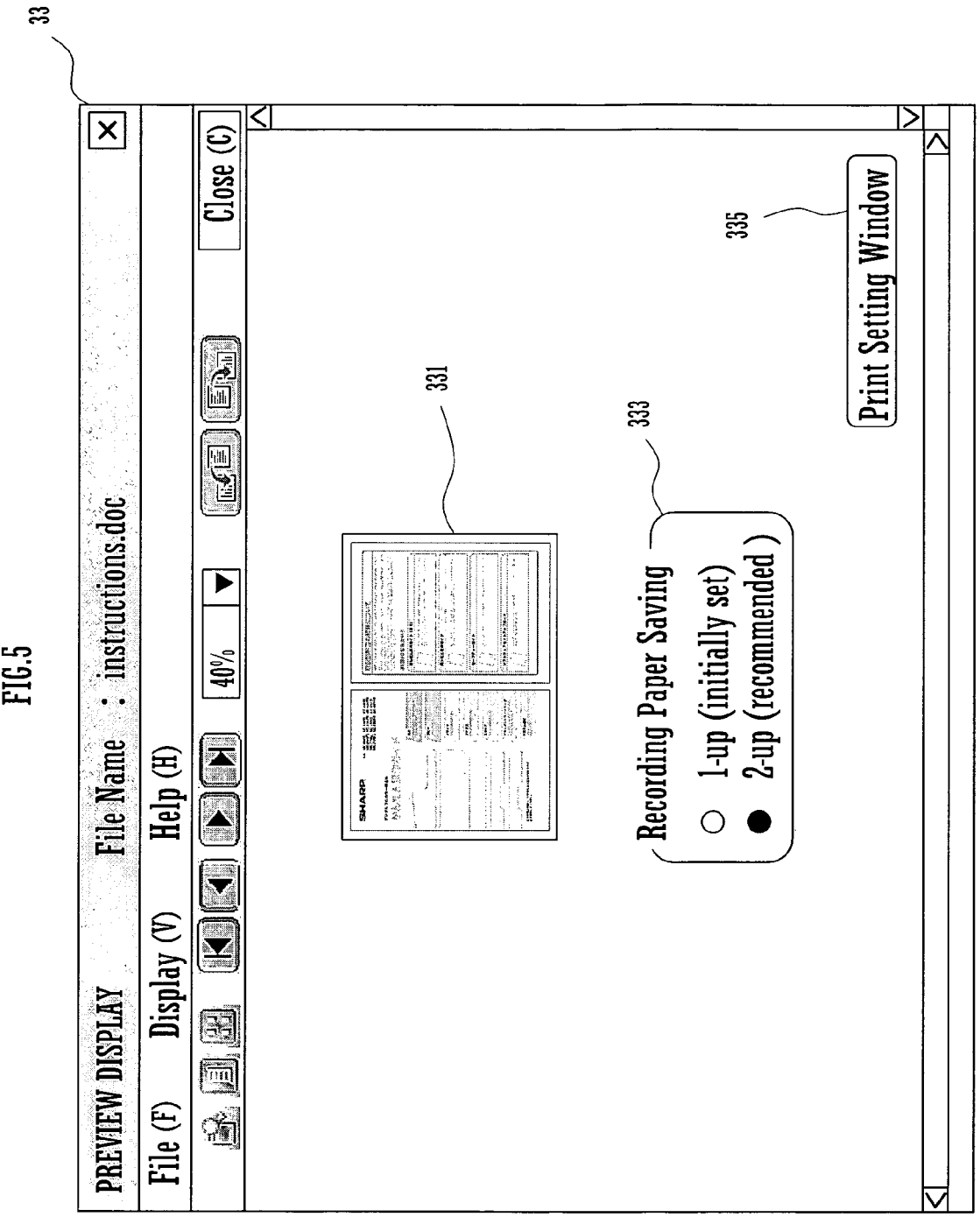
FIG. 5 is an illustration of the preview window displayed according to the print control program according to the first embodiment.

FIG. 5 shows a preview window 33 displayed on the display 22. In the preview window 33, a preview image 331, a print setting indication 333, and a print setting window button 335 are displayed. The preview image 331 represents an image or images as printed under the conditions set in the main setting window 32 one of which has been changed to further reduce the printing medium consumption by the printer 10. The print setting indication 333 indicates the function and name of the changed condition. If the user clicks on the print setting window button 335, the preview window 33 disappears, and the main setting window 32 appears.

The preview window 33 enables the user to visually preview an image or images as printed under the conditions set by the user one of which has been changed to further reduce the printing medium consumption. Accordingly, the print control program 213C according to this embodiment makes it possible to not only prompt the user to reduce the printing medium consumption (to save a resource) but also provide the user with a preview image representing a image or images as printed under the set conditions one of which has been changed to further reduce the printing medium consumption. The preview image makes it easy for the user to foresee the so printed image or images. This makes it easy for the user to determine whether to change one of the initially set printing conditions to a printing condition for a resource saving (reduction in printing medium consumption). This also makes it possible to reduce the user's hesitation in changing one of the set printing conditions to a printing condition for a resource saving. This further makes it possible to prevent an image or images from being printed in a condition not desired by the user.

If the user sets N-up printing based on the preview image on the display 22, it is possible to reduce the printing paper consumption by the printer 10, contributing to a resource saving (reduction in printing paper consumption).

If the control unit 211 determines at S30 that N-up printing is set, this unit determines at S60 whether double-side printing is set. If the control unit 211 determines at S60 that double-side printing is not set, this unit forms at S70 a preview image representing two or more images as printed on a double-side printing mode. Then, at S50, the control unit 211 displays the preview image on the display 22.

If the user sets double-side printing based on the preview image on the display 22, it is possible to reduce the printing paper consumption, contributing to a resource saving (reduction in printing paper consumption).

If the control unit 211 determines at S60 that double-side printing is set, this unit determines at S80 whether back-side printing is set. If the control unit 211 determines at S80 that back-side printing is not set, this unit forms at S90 a preview image representing an image or images as printed in a back-side printing mode. Then, at S50, the control unit 211 displays the preview image on the display 22.

If the user sets back-side printing based on the preview image on the display 22, it is possible to reduce the printing paper consumption by effectively using the blank sides of printed sheets of paper. This contributes to a resource saving (reduction in printing paper consumption).

If the control unit 211 determines at S80 that back-side printing is set, this unit determines at S100 whether "Fit To Page" printing is set. If the control unit 211 determines at S100 that "Fit To Page" printing is not set, this unit forms at S110 a preview image representing an image or images as printed in a "Fit To Page" printing mode. Then, at S50, the control unit 211 displays the preview image on the display 22.

In determining whether "Fit To Page" printing is set, the control unit 211 may take account of the paper size set on the page 321B of the main setting window 32 (FIG. 3). For example, it is not realistic to use sheets of printing paper smaller than the convenient paper sizes B5 and A4. Therefore, if the paper size selected by the user is B4 or larger, the determination at S100 may be made.

If the user sets "Fit To Page" printing based on the preview image on the display 22, it may be possible to reduce the paper size, contributing to a resource saving (reduction in printing paper consumption).

If the control unit 211 determines at S100 that "Fit To Page" printing is set, this unit determines at S120 whether monochromatic printing is set. If the control unit 211 determines at S120 that monochromatic printing is not set, this unit forms at S130 a preview image representing one or more monochromatic images as printed. Then, at S50, the control unit 211 displays the preview image on the display 22.

If the user sets monochromatic printing based on the preview image on the display 22, it is possible to reduce the color toner consumption by the printer 10, contributing to a resource saving (reduction in color toner consumption).

If the control unit 211 determines at S120 that monochromatic printing is set, this unit determines at S140 whether toner saving is set. If the control unit 211 determines at S140 that toner saving is not set, this unit forms at S150 a preview image representing an image or images as printed in a toner saving mode. Then, at S50, the control unit 211 displays the preview image on the display 22.

If the user sets toner saving based on the preview image on the display 22, it is possible to reduce the toner consumption by the printer 10, contributing to a resource saving (reduction in toner consumption).

After S50, the control unit 211 waits at S160 until the decision button 328 in the main setting window 32 is clicked on (NO at S160). If the control unit 211 determines at S160 that the decision button 328 has been clicked on (YES in S160), this unit waits at S170 until the print start button 315 in the printing window 31 is clicked on (NO at S170).

If the control unit 211 determines at S170 that the print start button 315 has been clicked on (YES at S170), this unit makes the printer 10 start printing at S180 under the conditions set at S160. Then, at S190, the control unit 211 waits until the printing ends (NO at S190). If the control unit 211 determines at S190 that the printing has ended, this unit terminates the control process.

The print control program 213C according to this embodiment makes a preview image displayed. The preview image represents an image or images as printed under the conditions set by a user one of which has been changed to further reduce the printing medium consumption by the printer 10. The preview image prompts the user to a resource saving (reduction in printing medium consumption). The preview image makes it easy for the user to foresee the image or images printed under the set conditions one of which has been changed to further reduce the printing medium consumption.

This makes it easy for the user to determine whether to change one or more of the initially set printing conditions to one or more printing conditions for resource savings (reduction in printing medium consumption). This also makes it possible to reduce the user's hesitation in changing one or more of the initially set printing conditions to one or more printing conditions for resource savings. This further makes it possible to prevent an image or images from being printed in a condition or conditions not desired by the user.

Figure 6:
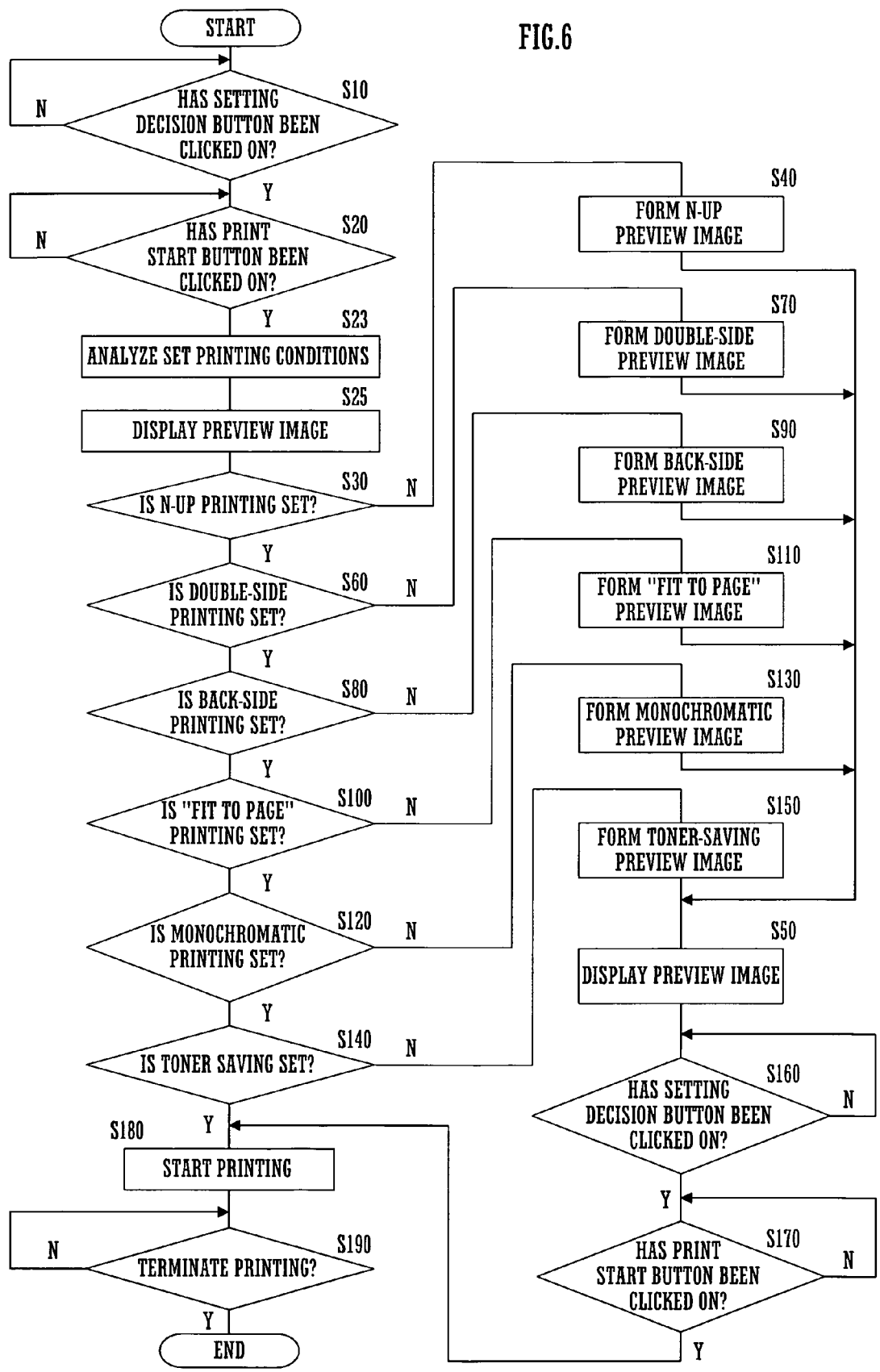
FIG. 6 is a flowchart of the control process according to a print control program according to a second embodiment of the present invention.

FIG. 6 shows the control process according to the print control program 213C according to the second embodiment. Descriptions common to the first and second embodiments will be omitted.

With reference to FIG. 6, if the control unit 211 determines at S20 that the print start button 315 in the printing window 31 has been clicked on (YES at S20), this unit analyzes at S23 the printing conditions set in the main setting window 32. Then, at S25, the control unit 211 forms a preview image representing an image or images as printed under the set conditions. Based on the result of the condition analysis, the control unit 211 executes the succeeding steps in FIG. 6.

Figure 7:
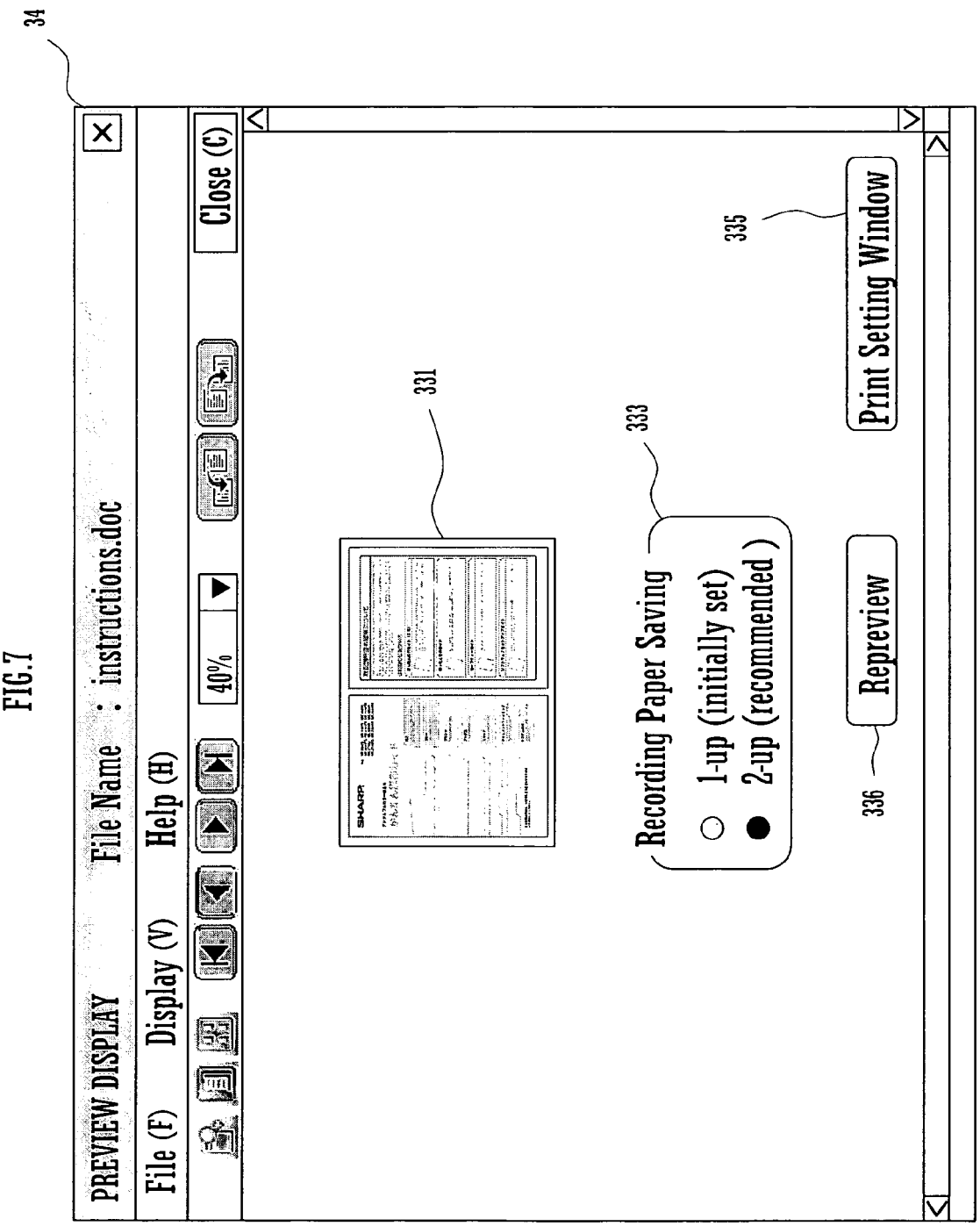
FIGS. 7-9 are illustrations of the preview windows displayed according to the print control program according to the second embodiment.

For example, the control unit 211 may form an N-up preview image (S40) and display it (S50), as shown in FIG. 7.

FIG. 7 shows a preview window 34 displayed on the display 22. In the preview window 34, a repreview button 336 is displayed in addition to a preview image 331, a print setting indication 333, and a print setting window button 335. A user can click on the repreview button 336 to switch the preview image between that formed at S25 and that formed at S40, S70, S90, 5110, S130, or S150.

Figure 8:
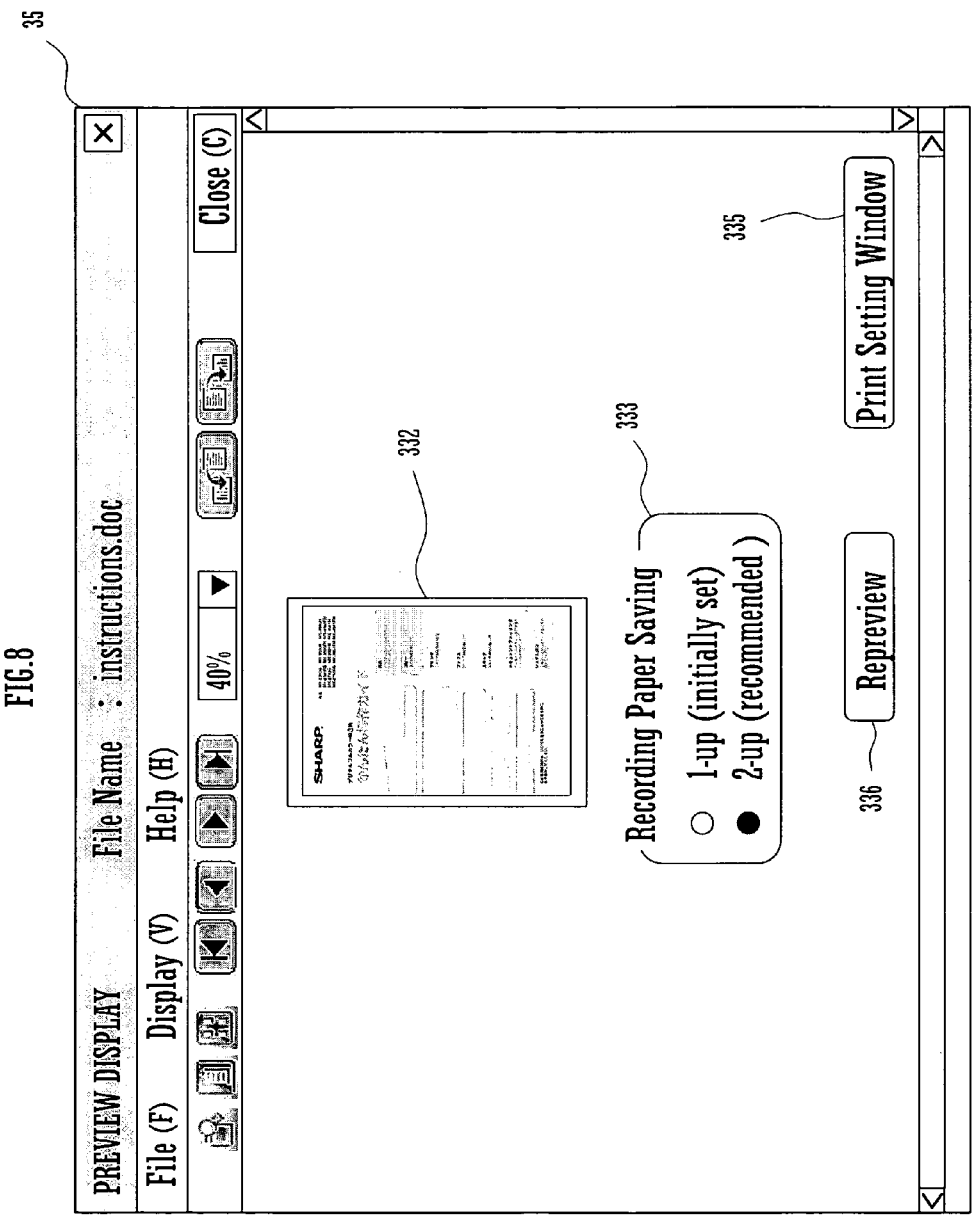

If the repreview button 336 is clicked on, the control unit 211 switches the preview window from the window 34 to a window 35 as shown in FIG. 8. In the preview window 35, a preview image 332, a print setting indication 333, a repreview button 336, and a print setting window button 335 are displayed. The preview image 332 is based on the printing conditions set by the user at S10. If the repreview button 336 is clicked on, the preview window 34 appears again.

The print setting indications 333 of the preview windows 34 and 35 indicate printing conditions under which the printer 10 to print the images represented by the preview images 331 and 332 respectively. Accordingly, even if the user lacks experience in printing, the user can easily grasp the printing conditions.

Figure 9:
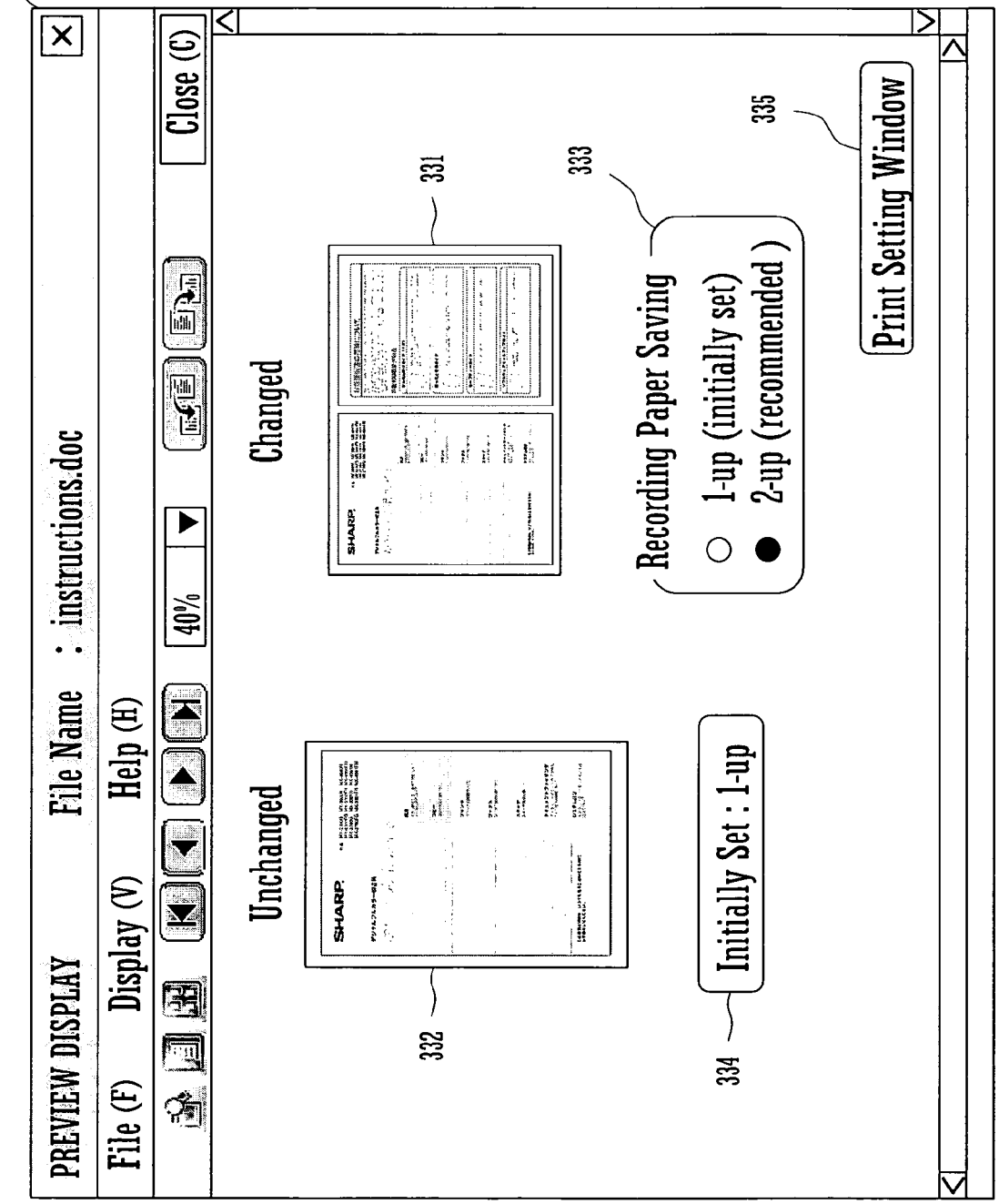

FIG. 9 shows another preview window 36 displayed on the display 22 according to the print control program 213C according to the second embodiment. In the window 36, two preview images 332 and 331 are displayed. The titles "Unchanged" and "Changed" are shown over the images 332 and 331 respectively. Two print setting indications 334 and 333 are shown under the images 332 and 331 respectively.

The preview image 332 represents an image or images as printed under the conditions set by the user. The preview image 331 represents an image or images as printed under the set conditions one of which has been changed to further reduce the printing medium consumption. The preview window 36 makes it easy to distinguish the two preview images. The two preview images can be compared in the single window, so that it is easy for the user to select a desired printing condition.

Figure 10:
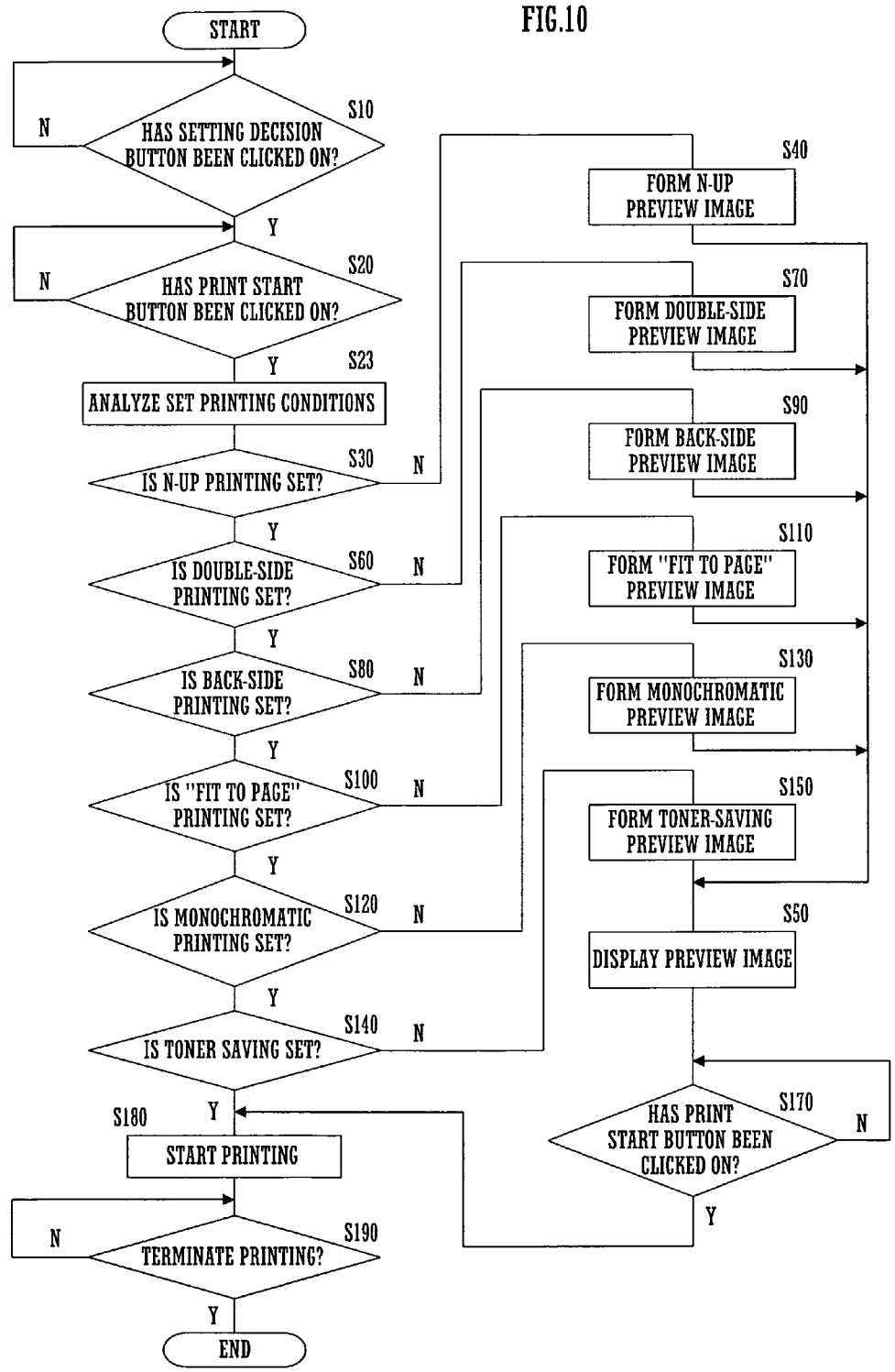
FIG. 10 is a flowchart of the control process according to a print control program according to a third embodiment of the present invention.
Figure 11:
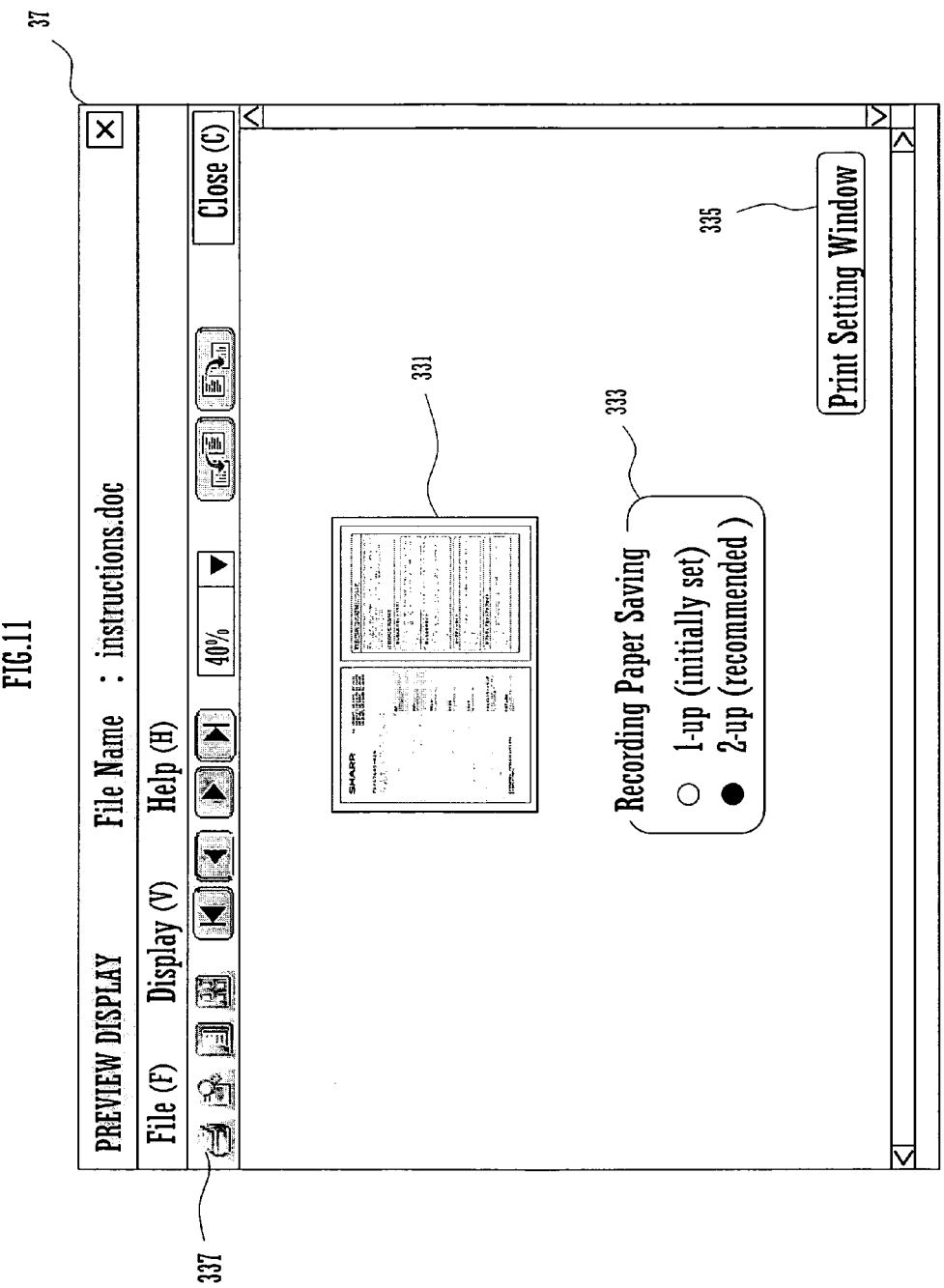
FIG. 11 is an illustration of the preview window displayed according to the print control program according to the third embodiment.

FIG. 10 shows the control process according to a print control program 213C according to the third embodiment. FIG. 11 shows the preview window 37 displayed on the display 22 according to this program 213C. Descriptions common to the first and third embodiments will be omitted.

Based on the result of the analysis at S23 of the printing conditions set in the main setting window 32, the control unit 211 may at S40, S70, S90, 5110, 5130, or 5150 form a preview image 331 as shown in FIG. 11. In this case, at S50, the control unit 211 displays the preview image 331 on the display 22. Subsequently, at S170, without reexecuting the steps of changing or deciding the printing conditions in the main setting window 32, the control unit 211 can instruct the printer 10 to do printing based on the preview image 331.

The control unit 211 waits at S170 until the print button 337 at the left end of an upper bar in the preview window 37 is clicked on (NO at S170). If the control unit 211 determines at S170 that the preview button 37 has been clicked on (YES at S170), this unit starts the printer 10 doing the printing based on the preview image 331 at S180.

Thus, by clicking on the print button 337, the user can have an image or images printed as represented by the preview image 331. The user can set printing conditions in the main setting window 32. The user can then change one of the set conditions to further reduce the printing medium consumption by the printer 10, without clicking on the print setting window button 335 in the preview window 37 in order to return to the main setting window 32 and change or decide the conditions again. This makes it possible to quickly start printing.

Figure 12:
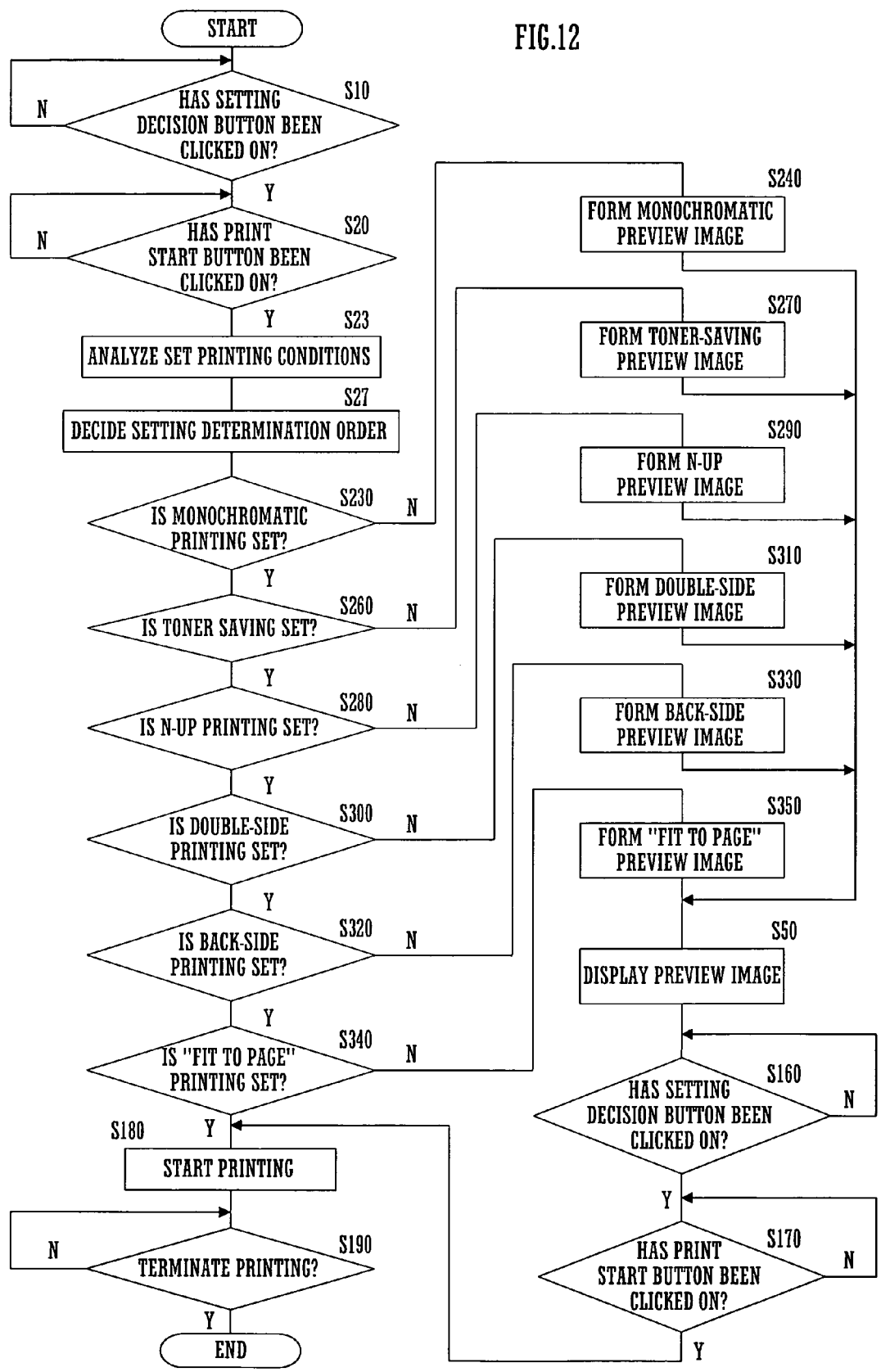
FIG. 12 is a flowchart of the control process according to a print control program according to a fourth embodiment of the present invention.

FIG. 12 shows the control process according to a print control program 213C according to the fourth embodiment. Descriptions common to the first and fourth embodiments will be omitted.

After the control unit 211 analyzes at S23 the printing conditions set in the main setting window 32, this unit decides at S27 the order of setting determination.

The order decision at S27 is based on the result of the condition analysis at S23. The control unit 211 may determine at S23 that N-up color printing is set in the main setting window 32. In this case, reduction in printing paper consumption is set, but reduction in toner consumption is not set, so that it preferable to form and display a preview image for reduction in toner consumption by priority. In FIG. 12, priority is given to reduction in toner consumption in the order decision at S27.

In this embodiment, the control unit 211 may change the setting determination order according to the printing conditions set by the user. This can prompt the user to efficient resource savings (reduction in printing medium consumption).

FIG. 13 shows the control process according to a print control program 213C according to the fifth embodiment. FIG. 14 shows a preview window 38 displayed on the display 22 according to this program 213C. Descriptions common to the first and fifth embodiments will be omitted.

Based on the result of the analysis at S23 of the printing conditions set in the main setting window 32, the control unit 211 may at S40, S70, S90, 5110, S130, or 5150 form a preview image 331 as shown in FIG. 14. In this case, at S50, the control unit 211 displays the preview image 331 on the display 22. Subsequently, at S52, the control unit 211 determines whether to reanalyze the printing conditions. When a preview image 331 is displayed for one of the printing conditions, the reanalysis of them is effective if it is desired to display a preview image 331 for another.

In the preview window 38, a preview image 331, a print setting indication 333, a print setting window button 335, and a reanalysis button 338 are displayed. The user can click on the reanalysis button 338 to make the control unit 211 reanalyze the printing conditions. If the user clicks on the print setting window button 335, without clicking on the reanalysis button 338 (NO in S52), the preview window 38 disappears, and the main setting window 32 appears on the display 22. If the reanalysis button 338 is clicked on (YES in S52), the control process proceeds to S23.

At S23, the control unit 211 reanalyzes the printing conditions. Subsequently, at S27, the control unit 211 decides the order of setting determination. In deciding the determination order, the control unit 211 puts a lower priority on the printing condition for which a preview image 331 was formed at S40, S70, S90, S110, S130, or 5150 and displayed at S50. This makes it possible to display a preview image 331 for another of the printing conditions.

In this embodiment, if the printing conditions have been analyzed two or more times, it is preferable that the control unit 211 should display two or more preview images as shown in FIG. 15. This enables the user to compare two or more printing conditions for reducing the printing medium consumption by the printer 10. The condition comparison enables printing under the conditions desired by the user.

FIG. 15 shows a preview window 39, where a 2-up preview image 331, a monochromatic preview image 339, two print setting indications 333, a reanalysis button 338, and a print setting window button 335 are displayed.

In order for the printing conditions shown by both of the preview images 331 and 339 to be reflected on printing, the user clicks on the print button 337 at the left end of an upper bar in the preview window 39, without needing to click on the print setting window button 335 to return to the main setting window 32 and change or decide one or more of the printing conditions again. This makes it possible to quickly start printing.

In order for the printing condition shown by one of the preview images 331 and 339 to be reflected on printing, the user needs to click on the print setting window button 335 to return to the main setting window 32, again change the printing condition shown by the other preview image, and again decide the changed condition.

With reference to FIG. 1, the print control program 213C might be part of the printer driver 213B. If two or more printer drivers were installed in the information processor 20, any of them might cooperate with the print control program 213C.

It is not essential that the print control program 213C be installed in the information processor 20. If the printer 10 has a display, the program 213C might be installed in the printer 10. If the printer 10 is connected to the information processor 20 via a network, the program 213C might be installed in a print server on the network.

In each of the first, second and third embodiments, every time the control unit 211 makes a determination for one of the printing conditions, this unit may form one or two preview images representing an image or images as printed with this condition changed for the reduction in printing medium consumption. Alternatively, the control unit 211 might make determinations for all of the printing conditions and subsequently form one or two preview images representing an image or images as printed under the conditions two or more of which have been changed for the reduction in printing medium consumption.

In each of the first, second and third embodiments, the control unit 211 makes determinations for the six printing conditions by way of examples. The control unit 211 might also make one or more determinations for one or more additional printing conditions.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A print control program for making an information processor control a printer connected to the processor, the processor having a display, the printer being able to do printing under conditions set by a user, the conditions being able to reduce the consumption of at least one of printing media by the printer, the media being printing paper, toner and ink, the program comprising:
    a first step of waiting until an instruction is entered into the information processor to start printing under the set conditions;
    a second step of analyzing the set conditions if the information processor detects the entered instruction at the first step;
    a third step of forming a first preview image representing an image as printed under analyzed conditions at least one of which has been changed to further reduce the printing medium consumption and forming a second preview image representing the image that would be printed under the conditions analyzed at the second step; and
    a fourth step of displaying both formed preview images switchably on the display,
    wherein:
        the third step includes deciding an order of the set conditions based on a result of condition analysis at the second step and determining whether the set conditions are set to reduce the consumption in order from a set condition with a higher priority, and
        the first preview image, when one of the set conditions is determined to be set to reduce the consumption, represents an image as printed under the one of the set conditions that has been changed to further reduce the consumption.

2. The print control program as claimed in claim 1, wherein the fourth step includes discriminatively displaying the function and name of the condition changed at the third step.

3. The print control program as claimed in claim 1, further comprising:
    a fifth step of waiting until another instruction is entered into the information processor to start printing the image as represented by the preview image displayed at the fourth step; and
    a sixth step of starting, if the information processor detects the entered instruction at the fifth step, printing the image as represented by the preview image.

4. The print control program as claimed in claim 1, wherein the third step includes forming the second preview image representing an image as printed under the conditions analyzed at the second step, and wherein the fourth step includes displaying the first and second preview images at the same time on the display.

5. The print control program as claimed in claim 1, wherein the preview image is displayed in a preview window on the display at the fourth step, the program further comprising a seventh step of transferring from the preview window to a print setting window.

6. A print control method for making an information processor control a printer connected to the processor, the processor having a display, the printer being able to do printing under conditions set by a user, the conditions being able to reduce the consumption of at least one of printing media by the printer, the media being printing paper, toner and ink, the method comprising:
    a first step of waiting until an instruction is entered into the information processor to start printing under the set conditions;
    a second step of analyzing the set conditions if the information processor detects the entered instruction at the first step;
    a third step of forming a first preview image representing an image as printed under analyzed conditions at least one of which further reduces the printing medium consumption and forming a second preview image representing the image that would printed under the conditions analyzed at the second step; and
    a fourth step of displaying both formed preview images switchably on the display,
    wherein:
        the third step includes deciding an order of the set conditions based on a result of condition analysis at the second step and determining whether the set conditions are set to reduce the consumption in order from a set condition with a higher priority, and
        the first preview image, when one of the set conditions is determined to be set to reduce the consumption, represents an image as printed under the one of the set conditions that has been changed to further reduce the consumption.

* * * * *